United States Patent [19]
Noll et al.

[11] 3,788,665
[45] Jan. 29, 1974

[54] OCCUPANT RESTRAINT SYSTEM

[75] Inventors: James L. Noll, Livonia; John F. Zens, Algonac, both of Mich.

[73] Assignee: General Motors Corporation, Detroit, Mich.

[22] Filed: May 12, 1971

[21] Appl. No.: 142,533

[52] U.S. Cl. ........ 280/150 AB, 137/525.1, 141/311
[51] Int. Cl. .......................................... B60r 21/08
[58] Field of Search........280/150 AB; 244/31; 137/525.1; 141/311, 313, 314, 315

[56] References Cited
UNITED STATES PATENTS

| | | | |
|---|---|---|---|
| 2,662,724 | 12/1953 | Kravagna | 137/525.1 X |
| 2,644,663 | 7/1953 | Kungler | 137/525.1 X |
| 2,674,064 | 4/1954 | Gassaway | 137/525.1 X |
| 3,514,125 | 6/1968 | Nemecer | 280/150 AB |
| 3,610,657 | 10/1971 | Cole | 280/150 AB |
| 3,642,303 | 2/1972 | Irish et al. | 280/150 AB |
| 3,230,663 | 1/1966 | Shabram | 137/525.1 X |
| 2,998,826 | 9/1961 | Sadler | 137/525.1 X |
| 2,629,393 | 2/1953 | Langdon | 137/525.1 X |
| 3,618,976 | 11/1971 | Leising et al. | 280/150 AB |

Primary Examiner—Kenneth H. Betts
Assistant Examiner—John P. Silverstrim
Attorney, Agent, or Firm—Herbert Furman

[57] ABSTRACT

An occupant restraint system includes a cylindrical diffuser which is communicated with a source of pressure fluid. The diffuser includes first and second rows of axially spaced partial circumferentially extending slots, the rows being spaced circumferentially of each other. A torso cushion surrounds the diffuser and is inflated from the first row. A knee cushion fits within the torso cushion and includes a slit in the wall thereof. Annular brackets on the inside and outside of the wall enclose a planar portion of the wall including a slit and are bolted to each other through the cushion. Encircling portions of the outside bracket receive the diffuser to locate the enclosed portion of the cushion wall tangent to the outer surface of the diffuser with the slit extending transversely of the second row of slots. A flexible sleeve is secured to the cushion wall and extends inwardly of the cushion from the slit. The sleeve provides a one-way valve permitting inflation of the cushion from the slit and preventing reverse flow of pressure fluid from the cushion.

6 Claims, 6 Drawing Figures

INVENTORS
James L. Noll &
John F. Zens
BY Herbert Furman
ATTORNEY

PATENTED JAN 29 1974 3,788,665
SHEET 3 OF 3
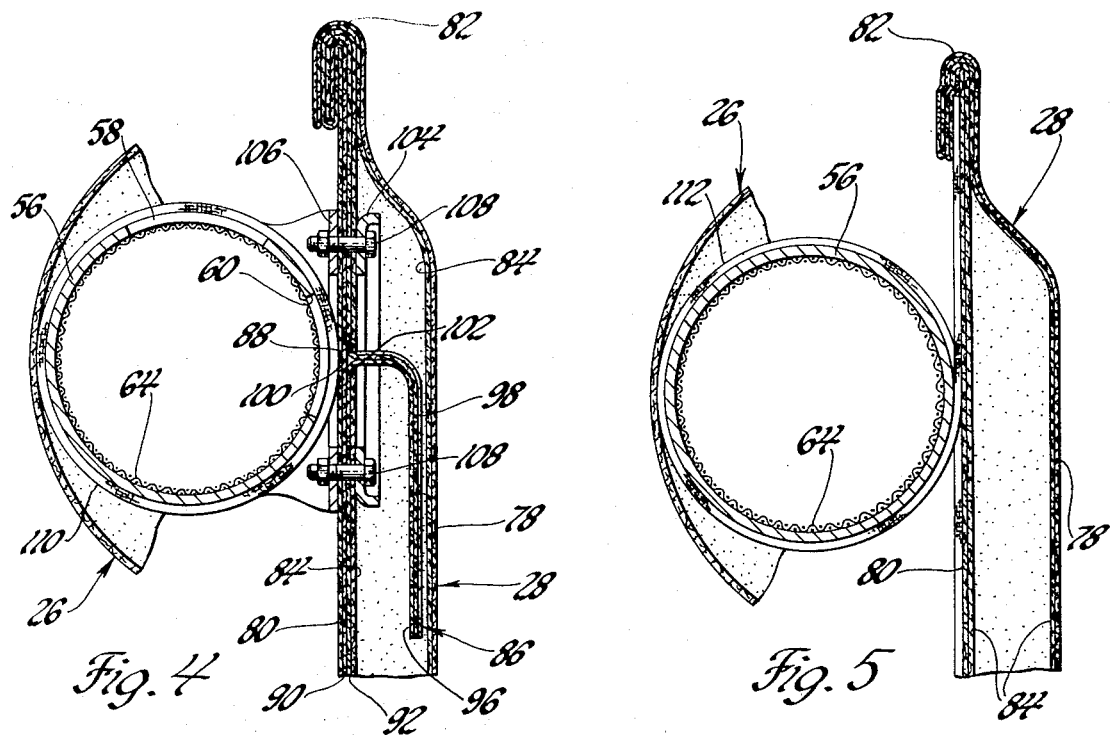
Fig. 4
Fig. 5
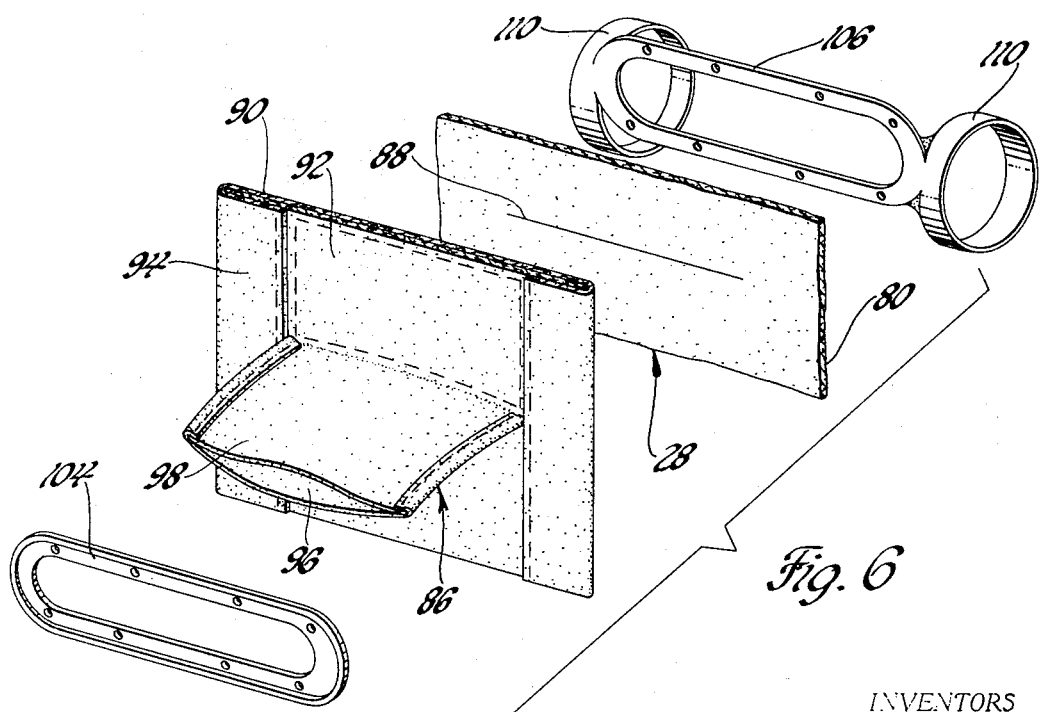
Fig. 6
INVENTORS
James L. Noll &
John F. Zens
BY
Herbert Furman
ATTORNEY

3,788,665

OCCUPANT RESTRAINT SYSTEM

This invention relates generally to occupant restraint systems and more particularly to an occurpant restraint cushion.

It is known to provide occupant restraint systems having knee cushions to locate the knees of a restrained occupant with respect to the vehicle. Such knee cushions may be separate from a torso cushion or may be enclosed therein.

The knee cushion of this invention is enclosed within the torso cushion in the manner disclosed in copending application Ser. No. 11,189 Cole, filed Feb. 13, 1970, now U.S. Pat No. 3,610,657, and assigned to the assignee of this invention. In the preferred embodiment, the knee cushion is inflated through a slit in the wall thereof which receives pressure fluid directly from the diffuser slots and is located with respect to such slots by being included in a planar portion of the cushion wall which is enclosed by annular brackets. The brackets include integral circular portions which encircle the diffuser to locate the planar portion generally tangent to the outer surface of the diffuser and locate the slit immediately adjacent and transverse of the diffuser slots which conventionally extend partially circumferentially of the diffuser. The knee cushion is additionally secured to the diffuser by encircling straps. An inflatable sleeve extends from the inner surface of the cushion wall around the slit to provide a one-way valve. When pressure fluid flows from the diffuser slots and into the slit of the cushion, the sleeve is inflated to permit flow of the pressure fluid into the cushion. When the cushion is inflated, the sleeve is collapsed by the pressure fluid within the cushion to prevent reverse flow from the cushion to the diffuser.

It is therefore a primary feature of the knee cushion of this invention that a planar portion of the wall of the cushion is located in a predetermined relationship with respect to a number of partial circumferentially extending slots of a diffuser to locate a slit in such portion adjacent to and transversely of such slots. Another feature is that the planar portion is enclosed by brackets mounted on the diffuser to locate the slit with respect to the diffuser slots. A further feature is that the brackets locate the enclosed portion tangent to the outer cylindrical surface of the diffuser. Yet another feature is that an inflatable flexible sleeve surrounds the slit and extends from the inner surface of the cushion wall to the interior of the cushion to provide a one-way valve controlling communication between the cushion and the diffuser.

These and other features of this invention will be readily apparent from the following specification and drawings wherein:

FIG. 4 is an enlarged sectional view taken generally along the plane indicated by line 4—4 of FIG. 2;

FIG. 5 is a sectional view taken generally along the plan indicated by line 5—5 of FIG. 2; and FIG. 6 is an exploded sectional view of a portion of FIG. 2.

Figure 1:
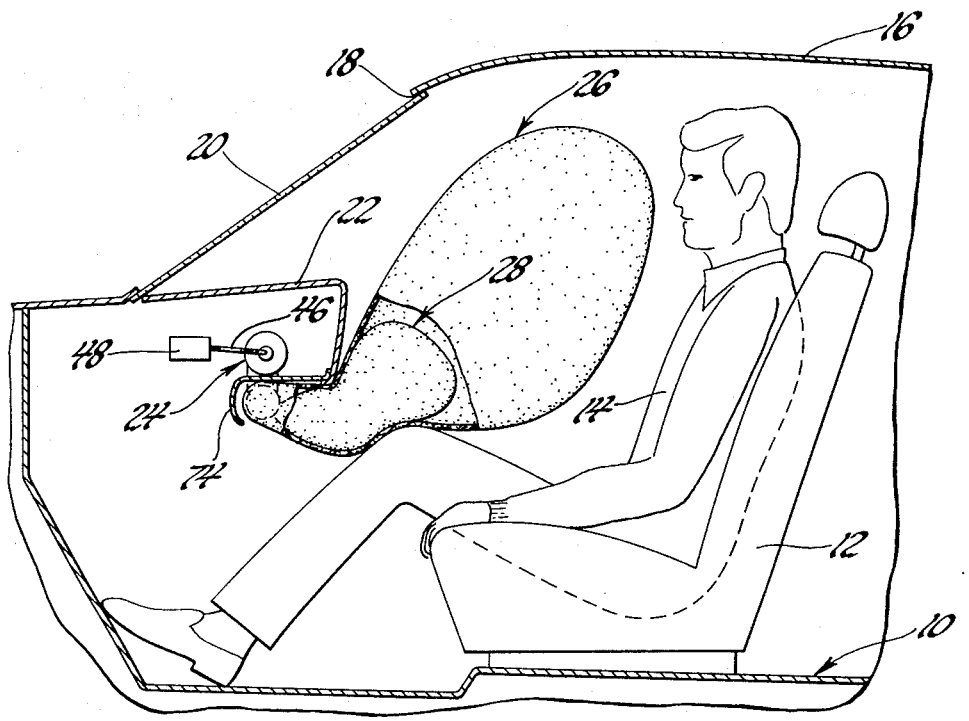
FIG. 1 is a partial view of a vehicle body embodying as occupant restraint system according to this invention and showing the knee cushion contained within a torso cushion, with both cushions being inflated.

Referring now particularly to FIG. 1 of the drawings, a vehicle body designated generally 10 includes a front seat 12 for supporting a passenger or occupant 14 in seated attitude. The roof structure 16 of the body cooperatively defines a windshield opening 18 with other body structure, with such opening being closed by a windshield 20. The instrument panel structure 22 of the body is located forwardly of the seat 12 and an occupant restraint system designated generally 24 is mounted within such instrument panel structure. Generally, the system 24 includes a torso cushion 26 which is inflated to provide a restraint for the torso of the occupant 14 and a knee cushion 28 which is contained within the torso cushion and simultaneously inflated therewith to provide a knee restraint for such occupant.

Figure 2:
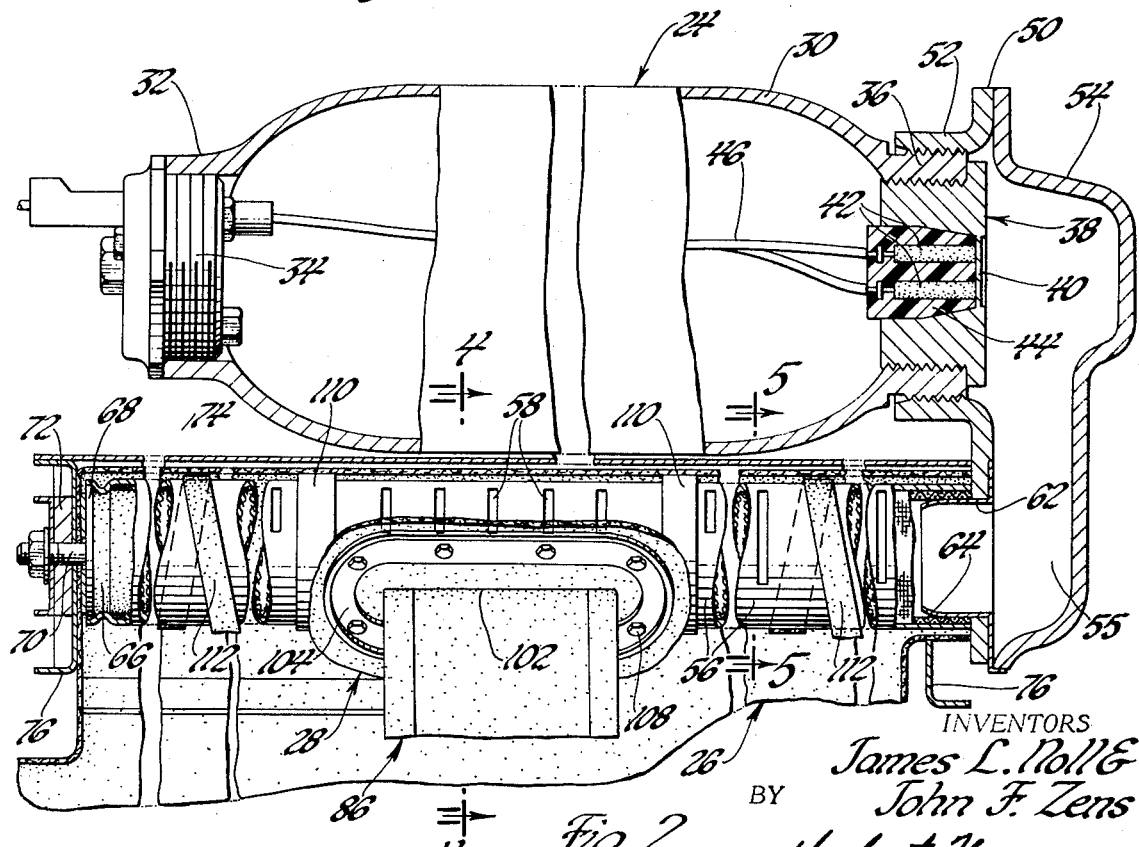
FIG. 2 is an enlarged view of a portion of FIG. 1.
Figure 3:
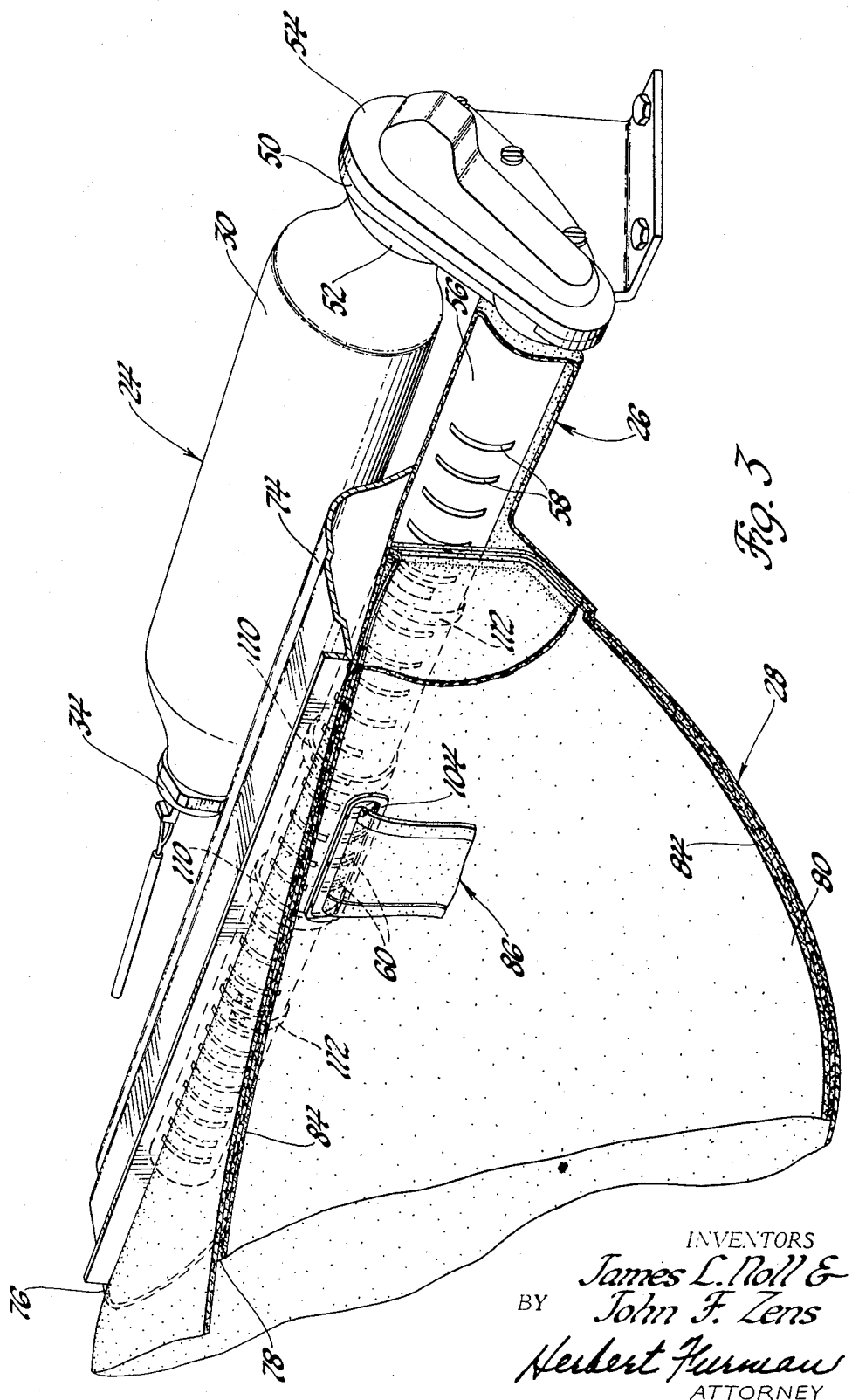
FIG. 3 is a perspective view of a portion of FIG. 1.

The details of certain parts of the system 24 form no part of this invention and will therefore be only generally described. As shown in FIGS. 2 and 3, the system includes a pressure vessel 30 containing air or nitrogen under pressure in the order of 3,500 psi. An internally threaded neck 32 of the vessel is closed by a fill, pressure sensing, and pressure relief valve assembly 34, while the other internally and externally threaded neck 36 of the vessel is closed by a combined detonator and diaphragm assembly 38. The assembly 38 includes a rupturable diaphragm 40 and a pair of detonators 42 which are encased in plastic material 44 and are electrically fired through wires 46. The wires pass through the vessel and through the valve assembly 34 to a conventional sensor 48 which senses acceleration pulses applied to the vehicle and connects wires 46 to a source of power when such pulses exceed a predetermined amplitude and time. Upon firing of the detonators 42, the diaphragm 40 is ruptured to release the contents of the vessel.

An inner manifold plate 50 includes a threaded boss 52 which threadedly receives the neck 36 of vessel 30. An outer manifold plate 54 is secured to the plate 50 to define therewith a manifold 55 receiving the contents of the vessel 30 upon rupture of the diaphragm.

A cylindrical tube or diffuser 56 is provided with a first row of axially spaced partially circumferentially extending slots 58 and a second, much shorter row of axially spaced partially circumferentially extending slots 60, FIG. 3 located circumferentially of slots 58. A flanged tubular member 62 extends from an opening of the plate 50 and is received within one open end of the diffuser 56 as well as within the internal mesh scree 64 enclosed within such diffuser. The diffuser and screen seat on plate 50 and are secured to the member 62 by conventional sheet metal screws, not shown. The other open end of the diffuser receives a cylindrical rubber member 66 having a peripheral groove receiving an embossed rib of the diffuser to secure the member 66 thereto and close the other end of the diffuser. A metal washer 58 is secured to the rubber member 66 and includes a threaded extension 70 bolted to the vehicle body by bracket structure 72. A housing assembly surrounds the diffuser and includes a generally U-shaped housing 74 opening to the occupant 14 and having the ends thereof closed by plates 76. The pressure vessel 30, manifold plates 50 and 54, diffuser 56 and housing 74 are additionally secured to the vehicle body by suitable bracket structures.

The cushion 26 receives the diffuser 56 therein and is inflated from the slots 58 upon communication of the diffuser with the pressure vessel by the manifold 55.

The knee cushion is generally comprised of a sheet of suitable material, such as neoprene coated dacron or nylon, which is folded upon itself to provide upper and lower walls 78 and 80. The three unsecured edges 82 of the walls are folded over and stitched together as shown in FIGS. 4 and 5. As shown in FIG. 3, an inner reinforcing ply 84 is provided on both the upper and lower walls 78 and 80. The reinforcing plies 84 extend from the forward edge 82 of the cushion for approximately half the distance from such edge to the rear portion of the cushion engageable by the occupant. As shown in FIGS. 3, 4 and 6, an inflatable sleeve 86 extends from around a slit 88 in the lower wall of the cushion. The sleeve is part of an assembly which includes a lower ply 90 and an upper ply 92 stitched together. Edge portions 94 of the lower ply are folded over and stitched to ply 92. Flap portions 96 and 98 of the upper ply extend laterally thereto. The edges of flap portion 96 are folded over the stitched to the edge portions of flap portion 98 to provide the sleeve 86. This sleeve communicates a slot 100 in ply 90 with the interior of the cushion 28. Slot 100 communicates with and is aligned with slot 88. As shown in FIG. 4, plies 90 and 92 fit between the lower wall 80 and its reinforcing ply 84, with the sleeve 86 extending through a slit 102 in the ply 84 to the interior of the cushion.

An elongated generally O-shaped flanged bracket 104 fits within the cushion and surrounds a portion of the ply 84 of the cushion as well as the sleeve 86. A like shaped bracket 106 fits against the outer surface of wall 80 and is secured to the bracket 104 by means of bolts 108 which extend through suitable apertures in the brackets, the wall 80 and ply 84, an plies 90 and 92. Thus, the brackets 104 and 106 enclose a portion of the lower wall 80 of the cushion as well as the slit 88 and hold such portion in generally planar shape. The bracket 106 includes integral cylindrical portions or extensions 110 which encircle the diffuser 56 as shown in FIGS. 2 and 4 to thereby mount the cushion 28 on the diffuser. It can be seen that the brackets also locate the planar portion enclosed thereby generally tangent to the outer surface of the diffuser as well as locating the slit 88 tranversely of the slots 60.

Flexible bands 112, FIGS. 2 and 5, of material may be looped upon themselves and secured to the lower wall 80 of the cushion and to the forward edge 82 to additionally secure the cushion to the diffuser.

Upon rupture of the diaphragm 40 and the flow of the pressure fluid from the vessel 30 into the manifold 55 an diffuser 56, the fluid will flow through the screen 64 of the diffuser and through the slots 58 and 60 to inflate both cushions 26 and 28. As the fluid flows through the slots 60, it will slightly deflect the enclosed portion of the lower wall 80 of the cushion rearwardly or away from slots 60 to open the slits 88 and 100, inflate the sleeve 86 and then inflate the cushion 28. When the pressure of the fluid within the cushion equals or exceeds the pressure within the diffuser 26, the sleeve 86 will be deflated so that no fluid from within the cushion can return to the diffuser. Likewise the pressure of the fluid within the cushion will press the enclosed portion of the wall 80 against the outer surface of the diffuser to ensure that the slit 88 will remain closed.

The inflatable sleeve 86 may not be necessary in all installations since the action of the pressure fluid in the cushion 28 holding the enclosed portion of wall 80 and ply 84 against the diffuser 56 may be sufficient to hold the slit 88 closed and prevent flow from the cushion to the diffuser. In such instance, the sleeve 86 and the plies 90 and 92 may be dispensed with, and the slits 88 and 102 will directly communicate slots 60 with the interior of cushion 28. Slit 102 will be held closed in the same manner as slit 88 by the pressure fluid within the cushion 28.

Thus, this invention provides an improved occupant restraint system.

We claim:

1. An occupant restraint system comprising, in combination, a source of pressure fluid, an elongated diffuser assembly communicable with the source for receipt of pressure fluid therefrom and including a plurality of axially spaced partial circumferentially extending slots providing a pressure fluid outlet from the diffuser assembly, an occupant restraint cushion of flexible material including a planar wall portion having an elongated slit therein defined by abutting edges of integral portions of the wall portion, means interconnecting the cushion and the diffuser assembly and locating the slit of the cushion in immediate adjacent transverse relationship to the slots, the integral portions of the wall portion of the cushion being deflected inwardly of the cushion by the pressure fluid from the diffuser assembly to move the edges thereof out of abutting relationship and open the slit to communicate the diffuser assembly with the cushion and inflate the cushion, and means sealing the integral portions of the wall portion of the cushion around the slit to the diffuser assembly upon inflation of the cushion and return of the edges of the integral wall portions to abutting relationships.

2. The combination recited in claim 1 including flexible inflatable passage means extending from the cushion wall around the slit to the interior thereof and inflatable from the diffuser slots to inflate the cushion, the passage means being deflatable by cushion pressure to provide a one-way valve.

3. The combination recited in claim 1 including an inflatable sleeve secured to the inner wall of the cushion and surrounding the slit to inflate the cushion from the slots, the sleeve being deflatable upon attempted passage of pressure fluid from the cushion to the diffuser assembly through the slit and slots.

4. An occupant restraint system comprising, in combination, a source of pressure fluid, an elongated diffuser assembly communicable with the source for receipt of pressure fluid therefrom and including a plurality of axially spaced partial circumferentially extending slots providing a pressure fluid outlet from the diffuser assembly, an occupant restraint cushion including a wall portion of flexible material having an elongated slit therein defined by abutting edges of integral portions of the wall portion, means holding the wall portion of the cushion including the slit in planar shape, means interconnecting the cushion and the diffuser assembly and locating the planar shaped wall portion of the cushion adjacent to the diffuser with the slit of the wall portion extending in immediate adjacent transverse relationship to the slots, the integral portions of the wall portion of the cushion being deflected inwardly of the cushion by the pressure fluid from the diffuser assembly to move the edges thereof out of abutting relationship and open the slit to communicate the diffuser assembly with the cushion and inflate the cushion, and means sealing the integral portions of the wall portion of the cushion to the diffuser assembly upon inflation of the cushion and return of the edges of the integral wall portions to abutting relationship.

5. An occupant restraint system comprising, in combination, a source of pressure fluid, an elongated diffuser assembly communicable with the source for receipt of pressure fluid therefrom and including a plurality of axially spaced partial circumferentially extending slots providing a pressure fluid outlet from the diffuser assembly, an occupant restraint cushion including a wall of flexible material having an elongated slit therein defined by abutting edges of integral portions of the wall, bracket means enclosing the integral portions of the wall of the cushion and the slit, means mounting the bracket means on the diffuser assembly to locate the enclosed integral portions of the wall adjacent the diffuser assembly with the slit of the wall in immediate adjacent transverse relationship to the slots, the enclosed integral portions of the wall of the cushion being deflected inwardly by the pressure fluid from the diffuser assembly to move the edges thereof out of abutting relationship and open the slit to communicate the diffuser assembly with the cushion and inflate the cushion, and means sealing the integral portions of the wall of the cushion to the diffuser assembly upon inflation of the cushion and return of the edges of the integral wall portions to abutting relationship.

6. An occupant restraint system comprising, in combination, a source of pressure fluid, an elongated diffuser assembly communicable with the source for receipt of pressure fluid therefrom and including a plurality of axially spaced partial circumferentially extending slots providing a pressure fluid outlet from the diffuser assembly, an occupant restraint cushion including a wall of flexible material having an elongated slit therein defined by abutting edges of integral portions of the wall, bracket means on opposite sides of the wall of the cushion enclosing the integral portions of such wall including the slit, means securing the bracket means to each other through the wall of the cushion, means securing the bracket means to the diffuser to locate the enclosed integral portions of the cushion wall adjacent the diffuser with the slit of the cushion extending transversely of the slots, the enclosed integral portions of the wall of the cushion being deflected inwardly by pressure fluid from the diffuser assembly to move the edges thereof out of abutting relationship and open the slit to communicate the diffuser assembly with the cushion to inflate the cushion, and means sealing the integral portions of the wall of the cushion to the diffuser assembly upon inflation of the cushion and return of the edges of the integral wall portions to abutting relationship.

* * * * *